United States Patent
Marcey et al.

(10) Patent No.: US 7,305,677 B2
(45) Date of Patent: Dec. 4, 2007

(54) TRANSFER OF RUNTIME-BASED APPLICATION CODE

(75) Inventors: Joel I. Marcey, Folsom, CA (US);
Scott D. Smith, Portland, OR (US);
Kirk W. Dunsavage, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 616 days.

(21) Appl. No.: 10/402,176

(22) Filed: Mar. 27, 2003

(65) Prior Publication Data

US 2004/0194111 A1    Sep. 30, 2004

(51) Int. Cl.
*G06F 9/46* (2006.01)
*G06F 9/44* (2006.01)

(52) U.S. Cl. .................. 719/310; 719/313; 715/769; 717/110; 717/106

(58) Field of Classification Search ............ 709/219; 719/330
See application file for complete search history.

(56) References Cited

U.S. PATENT DOCUMENTS

| | | | |
|---|---|---|---|
| 5,765,205 A * | 6/1998 | Breslau et al. ............ 711/203 |
| 6,112,243 A | 8/2000 | Downs et al. | |
| 6,237,020 B1 * | 5/2001 | Leymann et al. ........... 709/201 |
| 6,249,836 B1 | 6/2001 | Downs et al. | |
| 6,477,569 B1 * | 11/2002 | Sayan et al. ............... 709/223 |
| 6,496,871 B1 * | 12/2002 | Koyama et al. ........... 719/317 |
| 2002/0037107 A1 * | 3/2002 | Trachtman .................. 382/232 |
| 2004/0064830 A1 * | 4/2004 | Irving et al. ............... 719/328 |
| 2004/0199614 A1 * | 10/2004 | Shenfield et al. .......... 709/220 |
| 2004/0215700 A1 * | 10/2004 | Shenfield et al. .......... 709/201 |

OTHER PUBLICATIONS

Boulis, Programming sensor networks with mobile agents, International Conference On Mobile Data Management pp. 252-256, Year of Publication: 2005.*
Singh et al., BrickNet: sharing object behaviors on the Net Virtual Reality Annual International Symposium, 1995.,On pp. 19-25.*
Web Services Routing Protocol (WS-Routing) Specification.*
Boulis, Programming sensor networks with mobile agents, International Conference On Mobile Data Management pp. 252-256, Year of Publication: 2005.*
Web Services Routing Protocol (WS-Routing) Specification, no data find.*

* cited by examiner

*Primary Examiner*—William Thomson
*Assistant Examiner*—Abdou K Seye
(74) *Attorney, Agent, or Firm*—Blakely, Sokoloff, Taylor & Zafman LLP

(57) ABSTRACT

A transfer of runtime-based application code is described. According to one embodiment of the invention, the application code includes an application code segment. An application code segment tag identifies the application code segment. The application code segment is sent via a messaging protocol to a first server that processes the application code and returns the results.

15 Claims, 9 Drawing Sheets

Application Code 300

[Multimedia ( .....) ]   --- 305 public void MultiCode()

{

// Code that is multimedia intensive

:

:

:

}

[Math( ......)]           --- 310

Public void MathCode()

{

// Code that is mathematical computation intensive

Lookup Table 320

| Server Specialty 325 | IP Network 330 |
|---|---|
| Multimedia | 111.222.333.444 |
| Math | 111.222.333.445 |
| Loop intensive | 111.222.333.456 |

Figure 3B

TRANSFER OF RUNTIME-BASED APPLICATION CODE

TECHNICAL FIELD

Embodiments of the invention relate to the field of distributed computing; and more specifically, to the transfer of dynamic runtime application code.

BACKGROUND

At times a local application server may access a remote server to perform a specific function within an application code. For example, the application code processing on a local server may include an application programming interface ("API") function call to a remote server. The API function call allows a local application on a local server to access a remote server to perform a specific function. After processing the function, the remote server returns the result values of the function call to the local server.

However, a constraint of using the API function call is that the application code must be edited (and possibly re-compiled) to update the application code with another remote server to be called. The updating of the application code to manage the remote servers that are to be utilized has the disadvantage of not being able to rapidly adapt to changes in the network environment, such as adding and removing servers from the network.

Furthermore, as an API function call must be pre-defined within the application code, the application code may not dynamically request an API function call to a remote server upon a change in the local processing environment.

BRIEF DESCRIPTION OF THE DRAWINGS

The invention may best be understood by referring to the following description and accompanying drawings that are used to illustrate embodiments of the invention. In the drawings:

FIG. 3A illustrates one embodiment of application code having code segment tags;

FIG. 3B illustrates one embodiment of a lookup table;

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

A mechanism to transfer dynamic runtime-based application code is described. According to one aspect of the invention, specific segments of application code in a dynamic runtime-based application are transferred to dynamic runtime implementations suited to process the workload associated with the application code. The results would then be returned to the original runtime implementation where the application is being processed.

The following description describes embodiments of the invention that include enhancements to a standards-based protocol called web services routing protocol ("WS-Routing"). WS-Routing is based on the Simple Object Access Protocol ("SOAP") standard defined by the World Wide Web Consortium and the Extended Markup Language ("XML"). However, those of ordinary skill in the art will recognize that alternative protocols may be used and enhanced without departing from the scope of the description.

A dynamic runtime specifies a platform execution environment for application software. In one embodiment, code that is processed in a dynamic runtime environment is first compiled to a common language above platform specific, native code. That common language is compiled to be processed on a given native platform using a mechanism well known to those of ordinary skill in the art. An example of a dynamic runtime environment is the European Computer Manufactures Association ("ECMA") standard Common Language Infrastructure ("CLI") that has the concept of declarative, custom attributes that can be inserted on top of code.

As will be described in the embodiments below, application code is compiled into the CLI's common intermediate language and executed on a CLI implementation. The CLI implementation is enhanced to monitor executing applications for tags specifying code functionality; to maintain a database of servers for which code can be executed (e.g., on other dynamic runtime enabled servers); and to maintain an execution state for code transferred to different servers in order to pass results back to the source application at the appropriate time, as will be described further below. This CLI implementation also has access to a library that contains an implementation of the WS-Routing specification.

Figure 1:
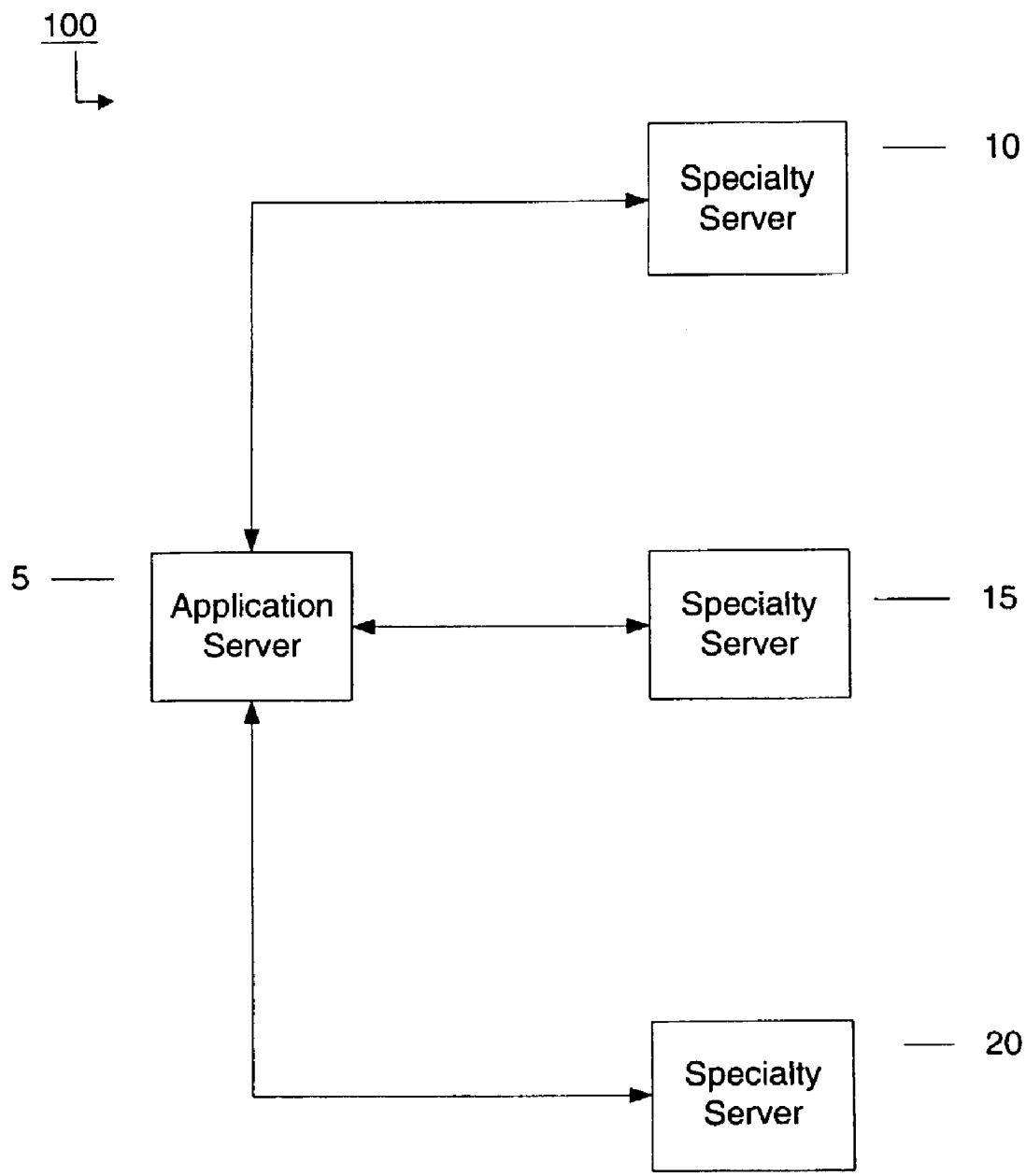
FIG. 1 illustrates one embodiment of a dynamic runtime environment.
Figure 2:
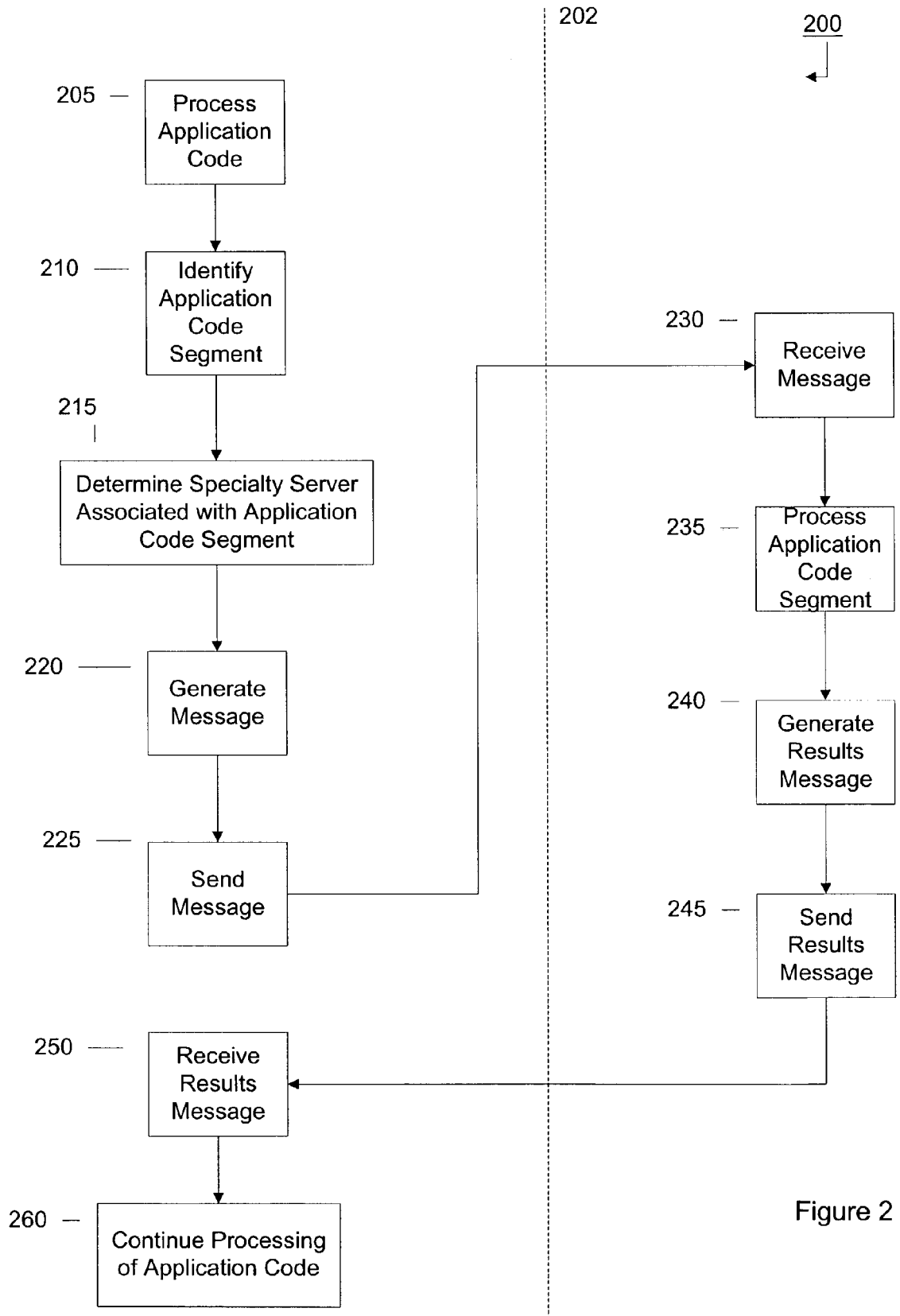
FIG. 2 illustrates one embodiment of a process to transfer dynamic runtime-based appplication code to a specialty server.

FIG. 1 illustrates one embodiment of a dynamic runtime environment 100. The dynamic runtime environment 100 has an application server 5, a specialty server 10, a specialty server 15 and a specialty server 20. FIG. 2 illustrates one embodiment of a process 200 to transfer dynamic runtime-based application code to a specialty server. In this way, application code may be transferred to various runtime environments which are better suited to process that application code and have the results of that process sent back to the original runtime environment, as will be described. FIG. 2 is segmented by line 202, separating the processing of the application server 10 and at least one of the specialized servers 10, 15 and 20.

A specialty server includes a runtime implementation on a platform more suited to process the application code or a specific application code segment, as will be described. For example, at times the application server 5 may not have the bandwidth or processing power to execute certain code segments. Therefore, upon encountering such a piece of code, the application server may transfer that code to another, similar runtime implementation which is on a platform more suited to execute that piece of code and get the results back to the original source application.

At block 205, application code on the application server 5 is processed. The application code has one or more application code segments.

At block 210, the application server 5 monitors and identifies one or more of the application code segments within the application code. Each application code segment may include code that has specific processing functionalities. A code segment tag may identify the application code segment.

FIG. 3A illustrates one embodiment of application code 300 having a code segment tag 305 and a code segment tag 310. In this embodiment, the code segment tags specify code functionality. In FIG. 3A, the code segment tag 305 identifies a multimedia tag. The multimedia tag signifies that this segment of code is multimedia intensive. The code segment tag 310 identifies a math tag. The math tag signifies this segment of code is mathematical computation intensive. In one embodiment, the code segment tags are stored with the compiled program as metadata. In this way, an application developer may control where to tag the code.

At block 215, the application server 5 determines which specialty server is to process the application code segment. For example, the application server 5 may examine the metadata associated with the identified tag and search in a lookup table or database to locate the appropriate specialty server to process the tagged code segment.

FIG. 3B illustrates one embodiment of a lookup table 320 that may be used to identify the specialty server associated with the tagged code segment. The lookup table 320 includes a server specialty column 325 and an IP network column 330. Upon identifying the code segment tag, the application server 5 identifies the row(s) in the lookup table for the identified code segment tag. Upon identifying the row associated with the code segment tag, the application server 5 identifies the location of the appropriate specialty server. For example, FIG. 3B shows a multimedia tag associated with IP address 111.222.333.444, which may be associated with specialty server 10. Alternatively, the IP address column 330 may be replaced with a DNS server name, an alias to an IP address, or with other examples for identifying a remote server location well known to those of ordinary skill in the art.

At block 220, the application server 5 generates a message to send to the specialized server associated with the identified application code segment. In one embodiment, the message includes the application code segment. In another embodiment, the message includes the entire application code. In yet another embodiment, the message includes a function call and parameters. The message may also include other programming elements such as a programming class, functions embedded within the class, Dynamic Language Libraries ("DLL") and other programming elements well known to those of ordinary skill in the art.

In one embodiment, the code is enclosed in a WS-Routing message. The WS-Routing message is used to transfer messages within the dynamic runtime environment 100. The WS-Routing is a SOAP-based, stateless protocol for exchanging XML-based messages from an initial sender to an ultimate receiver, possibly via a set of intermediaries. Bi-directional message exchange patterns are implemented via a reverse message path that is described in the WS-Routing specification.

In one embodiment, the message may also include information on the ordering of results. For example, tagging of the application code may also include providing information on the ordering of segment code results processed on a specialty server and returned. As the application server 5 encounters tagged code segments, it will examine the ordering information and create unique identifiers for the code segment that is about to be transferred as well as other code segments that are dependant on this code. The application server 5 maintains this list of identifiers and ensures that the application server 5 will only process the results of the related code segment in processing order when all of the results of the dependent code have been returned back to the source application.

At block 225, the message is sent to the identified specialty server associated with the specialty tag. For example, the application server 5 will send the application code segment associated with a multimedia intensive segment to specialty server 10. Specialty server 10 may have an Intel MMX based processor, by Intel Corporation of Santa Clara, Calif., which is designed to process multimedia-based applications efficiently.

At block 230, the specialty server receives the message.

At block 235, the specialty server processes the received application code segment.

At block 240, the specialty server generates a message to return one or more results of the processing of the application code to the application server 5.

At block 245, the specialty server sends the message to the application server.

At block 250, the application server 5 receives the message from the specialty server.

At block 260, the application server 5 continues processing the application code. This may include processing the results from the specialty server in the proper processing order.

It should be understood that, while the primary use of WS-Routing will be in the exchange of messages between web services, WS-Routing can also be used to pass messages directly to the application runtime environment. This is possible because WS-Routing-enabled messages neither know nor care about the content of the data contained within them, just that they follow the rules for describing a logical message path. In other words, as long as the platform that receives WS-Routing based messages can parse WS-Routing messages, and the message conforms to the WS-Routing schema, it does not matter how the messages being passed are going to be used.

It should also be understood the application code may block while waiting for the results to be returned from a specialty server. Alternatively, specific application code segments may be performed in parallel (e.g., multiple specialty servers performing multiple application code segments in parallel, processing the application code while the specialty server is processing an application code segment, etc.).

Figure 4:
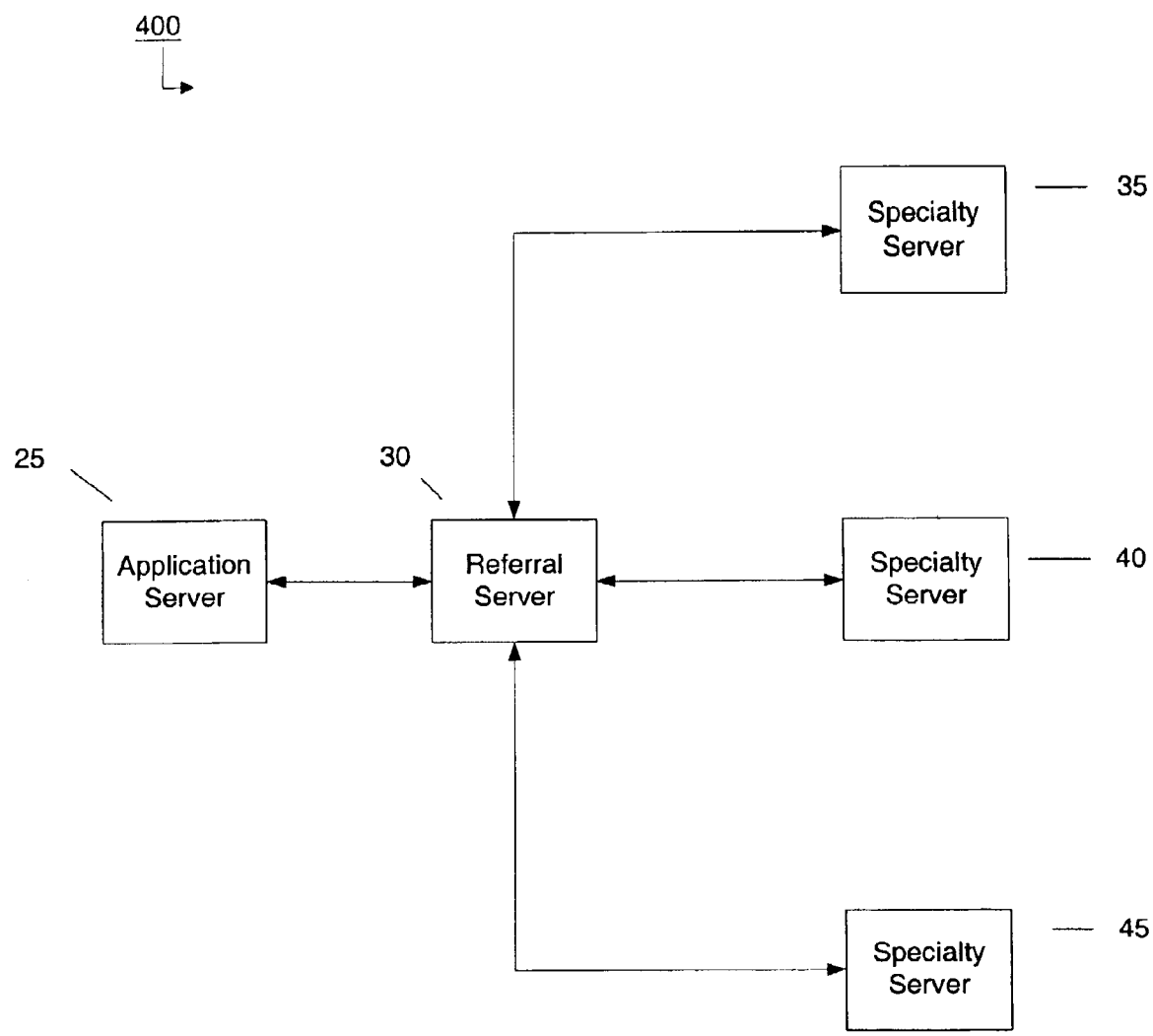
FIG. 4 illustrates another embodiment of a dynamic runtime environment.

FIG. 4 illustrates another embodiment of a dynamic runtime environment 400. The dynamic runtime environment 400 has an application server 25, a referral server 30, a specialty server 35, a specialty server 40 and a specialty server 45. In one embodiment, the referral server 30 has knowledge of multiple dynamic runtime implementations and the platform on which they are running. Therefore, the application server 25 need not include the lookup table or database as described in FIG. 3B.

In one embodiment, the Web Services Referral Protocol ("WS-Referral") is used. WS-Referral is a SOAP-based, stateless protocol for inserting, deleting and querying routing entries in a SOAP router (where a SOAP router is, for example, a server that supports the WS-Routing protocol). The WS-Referral provides a mechanism to dynamically configure a message path based upon the satisfying of pre-defined conditions.

For example, the pre-defined conditions may include instructions on the referral server 30 describing what to do with a message bound for specialty server 40. This embodiment of the invention describes a mechanism where, using enhancements within a dynamic runtime environment, WS-Routing and WS-Referral application code can be dynamically transferred to other dynamic runtime environments implemented on platforms that are best suited to run the application code.

Figure 5:
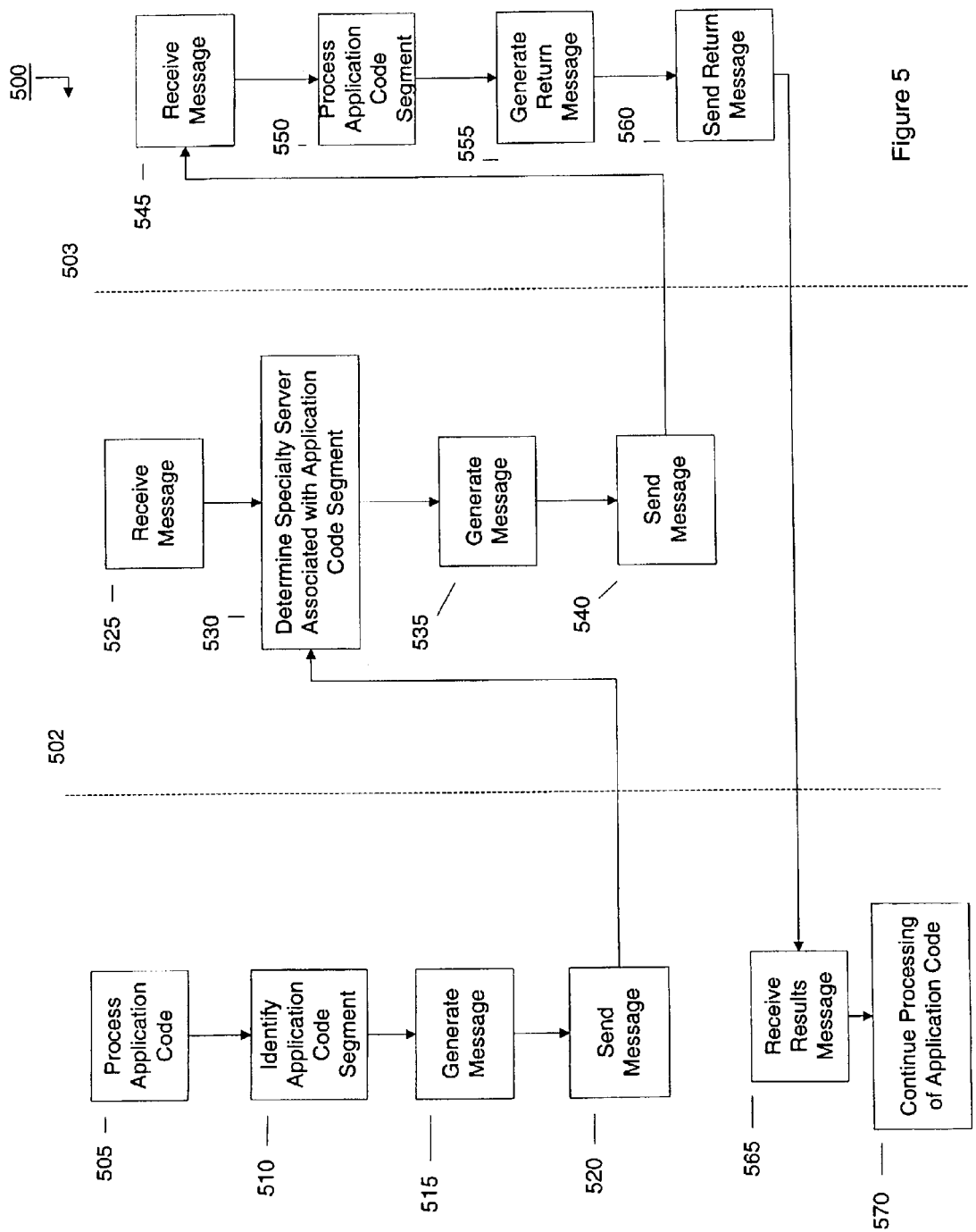
FIG. 5 illustrates another embodiment of a process to transfer dynamic runtime application code according to the servers in FIG. 4.

FIG. 5 illustrates another embodiment of a process 500 to transfer dynamic runtime application code according to the servers in FIG. 4. FIG. 5 is segmented by line 502 separating the processing of the application server 25 and the referral server 30 and line 503 separating the processing of the referral server 30 and at least one of the specialty servers 35, 40 and 45.

At block 505, application code on the application server 25 is processed. The application code having one or more application code segments.

At block 510, the application server 25 monitors and identifies one or more of the application code segments within the application code. Each application code segment may include code that has specific processing functionalities. The application code segment may be identified with a code segment tag, as described in FIG. 3A above.

At block 515, the application server 25 generates a message to send to the referral server 30. In one embodiment, the message includes the application code segment. In another embodiment, the message includes the entire application code. In one embodiment, as the application server 25 identifies the tagged code segment, it packages up the associated coded fragment in a WS-Routing message. WS-Routing provides the infrastructure to specify an ultimate endpoint, as well as a reverse path, so that ultimate endpoint can communicate the results back to the initial sender.

At block 520, the application server 25 sends the message to the referral server 30. The referral server 30 having implemented the enhanced WS-Referral specification to determine which specialty server to forward the message.

At block 525, referral server 30 receives the message.

At block 530, the referral server 30 will examine the WS-Routing message sent by the initial runtime environment implementation to determine the functional purpose of that code. The routing server 30 locates the appropriate specialty server 35, 40, or 45 to process the tagged application code segment from the application server 25. For example, the routing server 30 may search in a lookup table similar to the lookup table described above in FIG. 3B, among other examples.

At block 535, the referral server 30 generates a message to send to the specialized server associated with the application code segment. For example, the referral server 30, having knowledge of the location and specialties of each runtime environment implementation (e.g., specialty server 35, specialty server 40 and specialty server 45), will insert the location of the specialty server within the WS-Routing message that specifies a runtime implementation that is suited to handle the code workload.

At block 540, the message is sent to the identified specialty server associated with the specialty tag. In one embodiment, the referral server 30 includes its location (e.g., IP address) in the reverse path with the message to enable the identified specialty server to return the results to the referral server 30.

At block 545, the identified specialty server receives the message.

At block 550, the identified specialty server processes the received application code segment.

At block 555, the specialty server generates a message to return one or more results of the processing of the application code segment. In one embodiment, the identified specialty server will end the results, via the reverse path of the initial WS-Routing message, back to the original dynamic runtime implementation where the application was initially executed.

At block 560, the identified specialty server sends the message to the application server 25. In another embodiment, the specialty server returns the message to the referral server 30, which will then return the message to the application server.

At block 565, the application server 25 receives the message from the identified specialty server.

At block 570, the application server 25 continues with the processing of the application code. This may include processing the results from the specialty server in the proper processing order based on the information on the ordering of the results, as described above.

Figure 6:
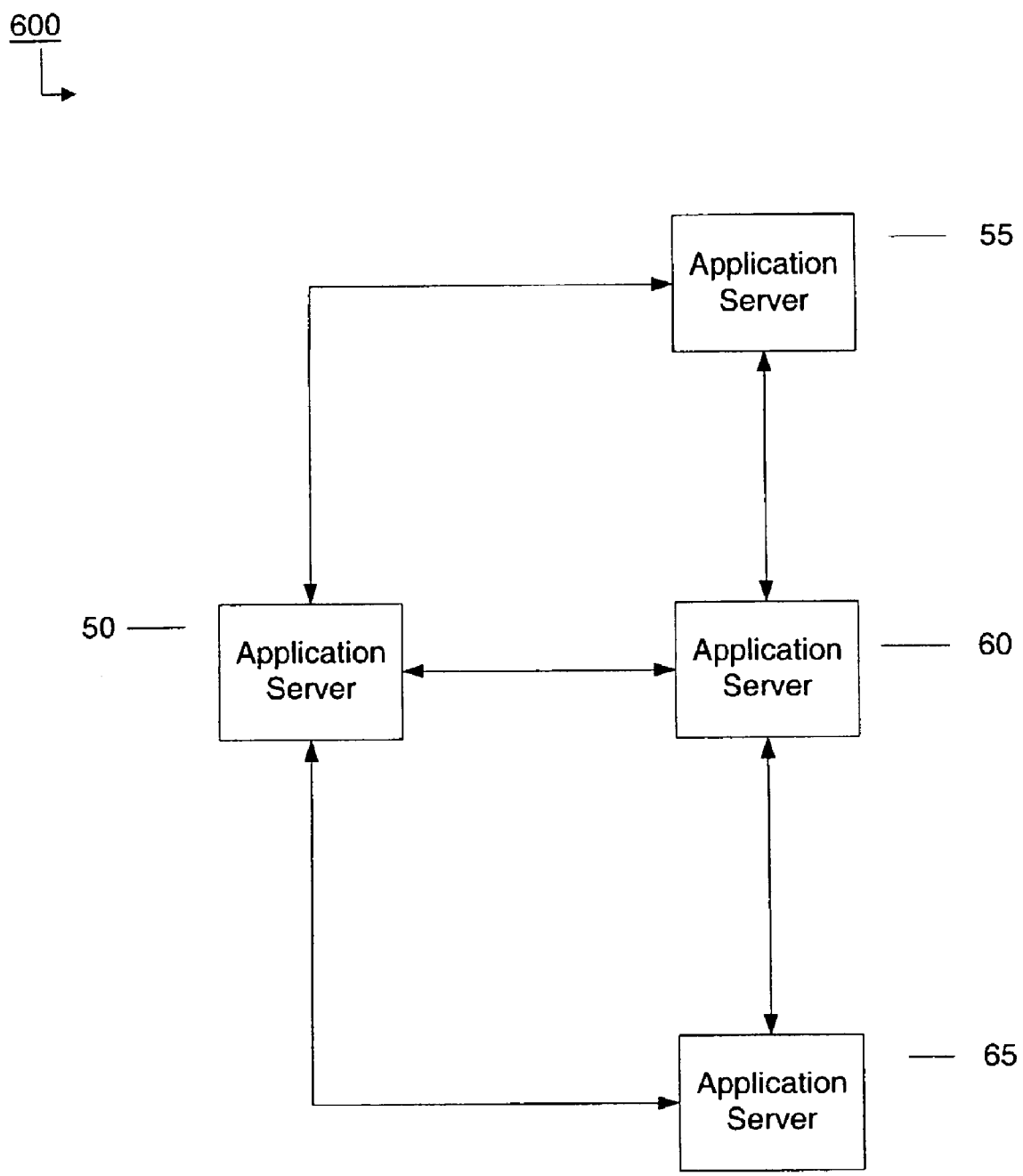
FIG. 6 illustrates yet another embodiment of a dynamic runtime environment.

FIG. 6 illustrates one embodiment of a dynamic runtime environment 600. The dynamic runtime environment 600 has an application server 50, an application server 55, an application server 60, and an application server 65.

In one embodiment, each server has implemented the WS-Routing specification and understands WS-Routing, SOAP-based messages. Thus, when a given runtime encounters an application that may burden the platform on which the application will be running, the runtime will determine the application server on which the application may run, specify one of the servers as the ultimate receiver (e.g., application server 65) and the others as intermediaries (e.g., application server 55 and application server 60), package up that code into a WS-Routing message and finally transfer the code to a first server (e.g., application server 55) in the message path. The message continues to follow the message path (each application server inserting itself into the reverse path along the way) until an application server is encountered that has the bandwidth to execute the application code. The application server that ultimately executes the application will then, in turn, send the results, if necessary, via the reverse path of the initial WS-Routing message, back to the original runtime implementation (e.g., application server 50) where the application began its initial execution, as will be described.

Figure 7:
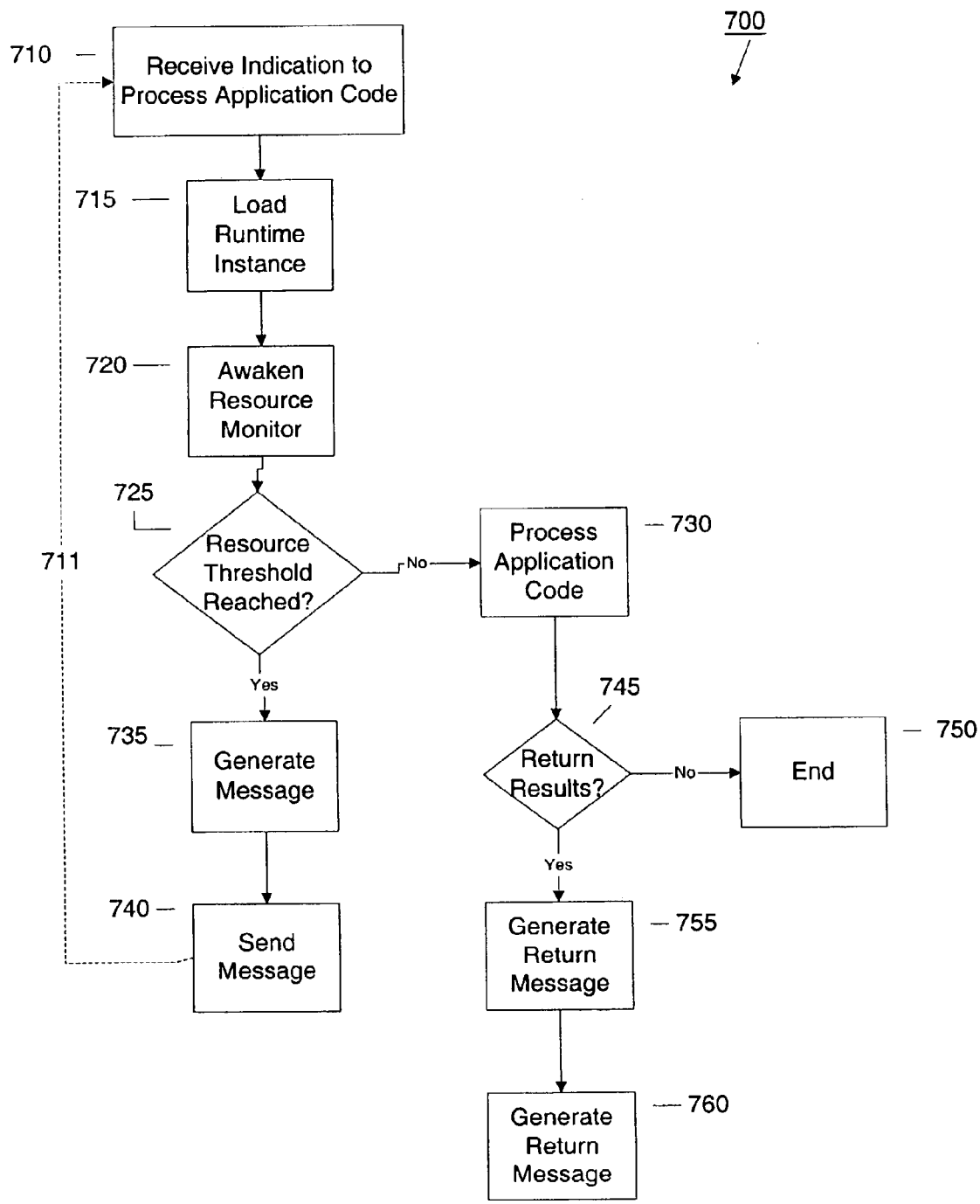
FIG. 7 illustrates yet another embodiment of a process to transfer dynamic runtime application code according to the servers in FIG. 6.

FIG. 7 illustrates one embodiment of a process 700 to transfer dynamic runtime application code according to the dynamic runtime environment of FIG. 6. One embodiment of the invention allows dynamic runtime-based application code to be transferred to platforms that contain another dynamic runtime implementations when the original server becomes overloaded, thus providing a specialized load balancing mechanism. The result for each code execution is passed back to the original application, as will be described.

As described, this embodiment of the invention uses WS-Routing and SOAP-based message protocols to transfer application code to (and results from) processing servers.

At block 710, the application server 50 receives an indication to process application code.

At block 715, the application server 50 loads a runtime environment instance. Any time a new application is loaded to be processed, a new instance of the runtime environment is usually loaded.

At block 720, the application server 50 includes a resource monitor process, which is awakened.

At block 725, the resource monitor process determines whether a resource threshold state has been reached. For example, if there are enough resources on the local application server 50 to process the application code, control passes to block 730. If there are not enough resources on the local application server 50 to process the application code, control passes to block 735.

At block 730, the application server 50 processes the application code and control passes to block 745.

At block 735, the application server 50 generates a message to be sent to an application server. The message includes a list of application servers that might process the application code. For example, the list of application servers may include application server 55, application server 60 and application server 65. In one embodiment, the message also includes the entire application code. In another embodiment, the message also includes a code segment of the application code.

In one embodiment, WS-Routing provides the infrastructure to specify a message path that includes an ultimate endpoint server (e.g., application server 65), intermediary server (e.g., application server 55 and application server 60), and a reverse path so that ultimate endpoint can communicate the results back to the application server 50. The application server 50 includes this in a WS-Routing message. It should be understood that if an intermediary server processes the application code, the message path might be "short-circuited," as will be described.

block 740, the application server 50 sends the message to the application server as defined in the message path. To continue the example, the application server 50 sends the message to application server 55. The application server 55 would receive the message and perform process 700 on its platform, as indicated by dashed line 711.

At block 745, the application server 50 determines whether the result of the processed application code is to be returned to the original application. For example, the application server 50 may inspect the reverse path to locate a reverse path entry. If there is a reverse path entry, control passes to block 755. If there is not a reverse path entry, control passes to block 750.

At block 750, the application code has been processed and the runtime instance may be closed.

At block 755, the application server 55 generates a return message based on the reverse path; the return message to include the results of the processed application code.

At block 760, the application server 55 sends the return message based on the reverse path.

It should be appreciated that when an application is to run on a given dynamic runtime implementation, this invention would allow the runtime to determine when the platform on which it is running is overloaded and then transfer future application execution requests to other implementations of dynamic runtimes on different application servers. This would alleviate the processing demands on the initial platform, thus providing a load-balancing infrastructure.

It should be appreciated that a WS-Routing message can be short-circuited, as shown in FIG. 7. This implies that a message does not have to travel the whole message path if an intermediary application server can accomplish a task on behalf of the ultimate receiver. It should also be understood that message path might be edited on the fly as the WS-Routing message travels from application server to application server. Thus, for example, if the application server that represents the ultimate receiver is also overloaded, it can insert another application server in the path.

Figure 8:
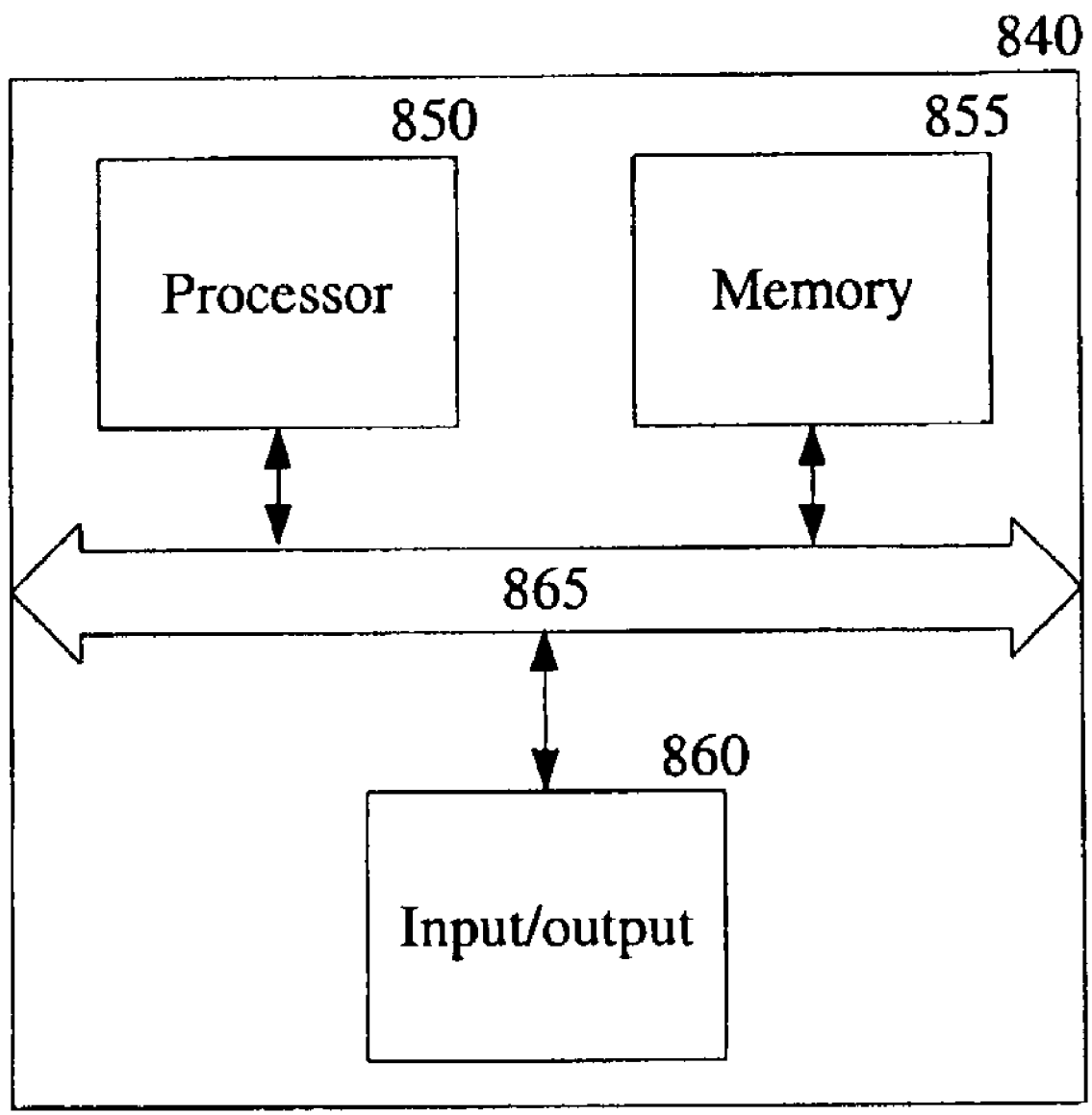
FIG. 8 illustrates an exemplary computer system according to one embodiment of the invention.

One embodiment of a computer system suitable to perform dynamic runtime-based applications is illustrated in FIG. 8. The computer system 840 includes a processor 850, a memory 855 and input/output capability 860 coupled to a system bus 865. The memory 855 is configured to store instructions which, when executed by the processor 850, perform the methods described herein. The memory 855 may also include a database or lookup table as illustrated in FIG. 3B. Input/output 860 includes a transmission component and a receiver component, such as a network interface card capable of wire and wireless communications between computer systems (e.g., application, referral and specialty servers). Input/output 860 also provides for the delivery and display of the video content or portions or representations thereof. Input/output 860 also encompasses various types of machine-readable media, including any type of storage device that is accessible by the processor 850.

The description of FIG. 8 is intended to provide an overview of computer hardware and other operating components suitable for implementing embodiments of the invention, but is not intended to limit the applicable environments. It will be appreciated that the computer system 840 is one example of many possible computer systems that have different architectures. A typical computer system will usually include at least a processor, a memory, and a bus coupling the memory to the processor. One of skill in the art will immediately appreciate that embodiments of the invention can be practiced with other computer system configurations, including multiprocessor systems, minicomputers, mainframe computers and the like.

It will be appreciated that more or fewer processes may be incorporated into the method(s) illustrated in FIGS. 2, 5 and 7 without departing from the scope of the invention, and that no particular order is implied by the arrangement of blocks shown and described herein. It further will be appreciated that the method(s) described in conjunction with FIGS. 2, 5 and 7 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions, which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks and. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

Thus, a mechanism to transfer runtime-based application code has been described. Embodiments of the invention allow dynamic runtime-based application code to be transferred to platforms that contain a runtime implementation specialized for processing specific workloads, as well as to have those results passed back to the original application.

It should be appreciated that since a dynamic runtime-based application is processed at the application level, the dynamic runtime abstracts the processor instruction set (and operating system), in effect making the processor instruction set a commodity in application development. For example, some silicon-based processors are designed to maximize productivity for certain types of code bases. For example, the Intel MMX-based processors, from Intel Corporation of Santa Clara, Calif., are designed to run multimedia-based applications well. In this way, many applications may contain code that can be segmented out into groups of functionality for processing. Also, this allows for application code to be processed in parallel with other pieces of code in the same application.

In addition, embodiments of this invention make use of a central referring server that performs the mapping of code functionality to the specific location of a platform to execute that functionality. It should be understood that the runtime embodiment may include various combinations of the runtime environments disclosed in FIGS. 1, 4 and 6 and the invention is not limited to only those illustrated. For example, an application server may include a lookup table of multiple referral servers, which may include a lookup table of additional referral, application and/or specialty servers.

It should be appreciated that the embodiments of the invention, as described, could also be used to alleviate the processing burden for any dynamic runtime environment by providing a load balancing mechanism where the application code is transferred to other dynamic runtime implementations on other platforms when a given application server is nearing or has reached a resource threshold. For example, a mechanism to load-balance an application server containing a dynamic runtime environment may be implemented by having a feature within the runtime to monitor the application server for an overloaded state and transfer any future applications, via WS-Routing, to other application servers containing a dynamic runtime environment. The results, if necessary, would then be returned to the original dynamic runtime implementation where the application is actually running.

In today's software industry, many applications require heavy processing power. A server can become overloaded and sluggish if it tries to process and execute too many of these types of applications simultaneously. For example, thousands of consumers executing a sale script could overload a server. Another example includes high computation, mathematical-based applications. This may be relevant, for example, to transfer the processing of customer orders to a specialty server when an application server becomes overloaded with order requests.

Another example includes a loop-intensive dynamic runtime application running on an application server with limited processing power, where that server has the knowledge of a powerful server with a dynamic runtime implementation that could handle many, if not all, of those loop computations, with the results passed back to the original server.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method to transfer application code, comprising:
processing an application code segment identified with a code segment tag specifying a code functionality;
generating a first message to include the application code segment and code segment tag;
sending the first message to a referral server associated with dynamic runtime environments;
selecting a specialty server having a dynamic runtime environment suitable for processing the application code segment based on the code functionality specified in the code segment tag; and
sending the first message to the selected specialty server to process the application code segment in the dynamic runtime environment.

2. The method of claim 1 further comprising:
identifying a location of the selected specialty server based on an entity in a lookup table associated with the application code segment tag.

3. The method of claim 1, wherein the first message is a WS-Routing message.

4. The method of claim 1, wherein the first message includes a programming class and a function associated with the programming class.

5. The method of claim 1, wherein the first message includes a path of one or more servers to return a result from the processing of the application code segment.

6. The method of claim 1 further comprising:
receiving a second message including a result associated with the application code segment.

7. A machine-readable medium having instructions to cause a machine to perform a method to transfer application code, the method comprising:
processing an application code segment identified with a code segment tag specifying a code functionality;
generating a first message to include the application code segment and code segment tag;
sending the first message to a referral server associated with dynamic runtime environments;
selecting a specialty sewer having a dynamic runtime environment suitable for processing the application code segment based on the code functionality specified in the code segment tag; and
sending the first message to the selected specialty server to process the application code segment in the dynamic runtime environment.

8. The machine-readable medium of claim 7 further comprising:
identifying a location of the selected specialty server based on an entity in a lookup table associated with the application code segment tag.

9. The machine-readable medium of claim 7, wherein the first message is a WS-Routing message.

10. The machine-readable medium of claim 7, wherein the first message includes a programming class and a function associated with the programming class.

11. The machine-readable medium of claim 7, wherein the first message includes a path of one or more servers to return a result from the processing of the application code segment.

12. The machine-readable medium of claim 7 further comprising:
receiving a second message including a result associated with the application code segment.

13. A system comprising:
an application server to execute an application including a code segment, wherein the application server generates a message corresponding to the code segment, the message including a programming class and a function associated with the programming class;
a referral server associated with dynamic runtime environments, the referral server communicatively coupled with the application server to receive the message corresponding to the code segment from the application server; and
a plurality of specialty servers communicatively coupled with the referral server, one or more of which have a dynamic runtime environment in which the code segment is capable of being executed;
wherein, in response to receiving the message corresponding to code segment, the referral server selects one of the specialty servers to execute the code segment in the specialty server's dynamic runtime environment based on the programming class and the function associated with the programming class.

14. The system of claim 13, wherein the message comprises a WS-Routing message.

15. The system of claim 13, wherein the message includes a path of one or more servers to return a result from the processing of the application code segment.

* * * * *